(12) United States Patent
Balk et al.

(10) Patent No.: US 8,106,129 B2
(45) Date of Patent: Jan. 31, 2012

(54) METHOD FOR THE PRODUCTION OF (METH) ACRYLATE-BASED ABA TRIBLOCK COPOLYMERS

(75) Inventors: Sven Balk, Frankfurt (DE); Gerd Loehden, Essen (DE); Christine Miess, Kahl (DE); Christine Troemer, Hammersbach (DE); Monika Maerz, Alzenau (DE)

(73) Assignee: Evonik Röhm GmbH, Darmstadt (DE)

( * ) Notice: Subject to any disclaimer, the term of this patent is extended or adjusted under 35 U.S.C. 154(b) by 289 days.

(21) Appl. No.: 12/301,903

(22) PCT Filed: Apr. 12, 2007

(86) PCT No.: PCT/EP2007/053533
§ 371 (c)(1),
(2), (4) Date: Nov. 21, 2008

(87) PCT Pub. No.: WO2008/012116
PCT Pub. Date: Jan. 31, 2008

(65) Prior Publication Data
US 2010/0280182 A1    Nov. 4, 2010

(30) Foreign Application Priority Data
Jul. 28, 2006 (DE) .......................... 10 2006 035 726

(51) Int. Cl.
*C08F 293/00* (2006.01)
*C08F 295/00* (2006.01)
(52) U.S. Cl. ......... 525/294; 525/242; 525/299; 525/302
(58) Field of Classification Search .................. 525/242, 525/293, 294, 298, 299, 302
See application file for complete search history.

(56) References Cited

U.S. PATENT DOCUMENTS

| | | | |
|---|---|---|---|
| 5,794,403 A | 8/1998 | Oberlander et al. | |
| 6,288,173 B1 | 9/2001 | Schimmel et al. | |
| 6,306,994 B1 * | 10/2001 | Donald et al. | 526/317.1 |
| 6,498,209 B1 | 12/2002 | Loehden et al. | |
| 6,566,441 B1 | 5/2003 | Lohden et al. | |
| 6,809,163 B2 | 10/2004 | Schultes et al. | |
| 6,989,409 B2 | 1/2006 | Loehden et al. | |
| 2005/0187346 A1 * | 8/2005 | Husemann et al. | 525/94 |
| 2007/0068088 A1 | 3/2007 | Einfeldt et al. | |
| 2007/0117948 A1 | 5/2007 | Loehden et al. | |
| 2007/0193156 A1 | 8/2007 | Kautz et al. | |
| 2007/0193159 A1 | 8/2007 | Schattka et al. | |
| 2007/0196655 A1 | 8/2007 | Schattka et al. | |
| 2007/0208107 A1 | 9/2007 | Schattka et al. | |
| 2007/0208109 A1 | 9/2007 | Kautz et al. | |
| 2007/0259987 A1 | 11/2007 | Schattka et al. | |
| 2008/0057205 A1 | 3/2008 | Lohden et al. | |
| 2008/0237529 A1 | 10/2008 | Schattka et al. | |
| 2008/0262176 A1 | 10/2008 | Loehden et al. | |
| 2008/0292893 A1 | 11/2008 | Loehden et al. | |
| 2008/0293854 A1 | 11/2008 | Schattka et al. | |
| 2009/0048401 A1 | 2/2009 | Loehden et al. | |

FOREIGN PATENT DOCUMENTS

| CN | 1430657 A | 7/2003 |
|---|---|---|
| WO | WO 01/90265 A1 | 11/2001 |

OTHER PUBLICATIONS

U.S. Appl. No. 12/304,275, filed Dec. 11, 2008, Balk et al.
U.S. Appl. No. 12/373,892, filed Jan. 15, 2009, Balk et al.
U.S. Appl. No. 12/373,732, filed Jan. 14, 2009, Balk et al.
U.S. Appl. No. 12/440,244, filed Mar. 6, 2009, Balk et al.
U.S. Appl. No. 12/674,552, filed Feb. 22, 2010, Balk et al.
U.S. Appl. No. 12/441,664, filed Mar. 17, 2009, Schattka et al.
U.S. Appl. No. 12/290,880, filed Nov. 4, 2008, Einfeldt et al.
U.S. Appl. No. 12/373,531, filed Jan. 13, 2009, Schattka et al.
U.S. Appl. No. 12/279,197, filed Oct. 21, 2008, Roos et al.
U.S. Appl. No. 12/522,269, filed Jul. 7, 2009, Balk et al.
Xu, Fu-Jian et al., "pH- and temperature-responsive hydrogels from crosslinked triblock copolymers prepared via consecutive atom transfer radical polymerizations", Biomaterials, Elsevier, vol. 27, pp. 2787-2797, XP 005272771, (2006).
Krasia, Theodora C. et al., "Amphiphilic Polymethacrylate Model Co-Networks: Synthesis by RAFT Radical Polymerization and Characterization of the Swelling Behavior", Macromolecules, vol. 39, No. 7, pp. 2467-2473, XP-001242509, (2006).
U.S. Appl. No. 12/282,011, filed Sep. 8, 2008, Balk et al.
U.S. Appl. No. 12/992,430, filed Nov. 12, 2010, Balk et al.
U.S. Appl. No. 13/125,177, filed Apr. 20, 2011, Kautz et al.
U.S. Appl. No. 13/127,533, filed May 4, 2011, Balk et al.
U.S. Appl. No. 13/127,534, filed May 4, 2011, Balk et al.
U.S. Appl. No. 13/128,777, filed May 11, 2011, Balk et al.
U.S. Appl. No. 13/128,957, filed May 12, 2011, Kautz et al.
U.S. Appl. No. 13/127,159, filed May 2, 2011, Balk et al.

* cited by examiner

*Primary Examiner* — Irina S Zemel
*Assistant Examiner* — Jeffrey Lenihan
(74) *Attorney, Agent, or Firm* — Oblon, Spivak, McClelland, Maier & Neustadt, L.L.P.

(57) ABSTRACT

The invention relates to a method for producing meth)acrylate-based ABA triblock copolymers in which the A blocks are amine-functionalized.

25 Claims, No Drawings

METHOD FOR THE PRODUCTION OF (METH) ACRYLATE-BASED ABA TRIBLOCK COPOLYMERS

The invention relates to a process for preparing (meth) acrylate-based ABA triblock copolymers with amine functionalization of the A blocks and to their use for example as a formulating ingredient of reactive hot-melt adhesives or seals.

Tailor-made copolymers with defined composition, chain length, molar mass distribution, etc. are a broad field of research. One of the distinctions made is between gradient polymers and block polymers. A variety of applications are conceivable for such materials. A number of them will briefly be presented below. The areas of use selected include some in which polymers are used from which the present invention is to be delimited.

One field of application of the polymers of the invention is as a reactive formulating ingredient in adhesives. Adhesives of this kind are described for example in U.S. Pat. No. 5,021,507. A principal ingredient are compounds containing free isocyanate groups, which are generally obtained by condensation reaction of an excess of polyisocynanate groups with polyols. To improve the adhesion properties to particular substrates these compounds containing free isocyanate groups have been admixed with binders, composed of polymers made from ethylenically unsaturated monomers. Binders used are typically polyalkyl (meth)acrylates having $C_1$ to $C_{20}$ alkyl groups. They are polymerized from the corresponding monomers, either prior to addition to the urethanes or in their presence, by means of free, radical polymerization.

As an alternative to the polyols used, the use of amine-functionalized poly(meth)acrylates is also conceivable. Compared to hydroxyl groups, amine groups have considerably higher reactivity with respect to isocyanates. The possibility of setting crosslinking rates in a targeted manner thus results, through selection of the functionality. Of interest also are formulations in which amine-functional and hydroxy-functional binders are present alongside one another and in this way stepwise curing of the formulation, which is of interest from a processing point of view, is made possible.

U.S. Pat. No. 5,866,656 and EP 10362103 describe reactive hot-melt adhesives in which the binders of poly(meth) acrylate are bonded covalently to the compounds containing free isocyanate groups in the adhesive composition. Since this bonding takes place usually as the result of a condensation reaction, adhesives of this kind in which this bonding has developed are referred to as adhesives in the condensation stage. The adhesives thus obtained are notable in relation to those described in U.S. Pat. No. 5,021,507 for increased elasticity and enhanced adhesion to particular metal substrates, and also by a longer open time—the time available for processing.

It is common knowledge that, besides the reaction with isocyanates, there are principally two applications in question for amine functions in the field of adhesives and sealants (on this point cf. B. Müller, W. Rath, Formulierungen von Kleb- and Dichtstoffen, 1st edition, Vincentz, Hanover, 2004): primary and secondary amines find use above all as curing agents for epoxy resins. With monofunctional amines it is possible in this way to realise an increase in the degree of polymerization. With polyfunctional building blocks it is possible to carry out a crosslinking reaction. Two-component systems with functionalized poly(meth)acrylates as reactive components represented an entirely new approach to an adhesive formulation. Tertiary amines, on the other hand, catalyse the ring-opening polymerization of epoxides. On the basis of this approach as well it would be possible to conceive of a two-component adhesive formulation. In that case, however, in contradistinction to the formulation described above, a sub-stoichiometric amount of the amine component would be sufficient.

Secondly, primary or secondary diamines can be used with dicarboxylic acids for the synthesis of polyamides. This well-established polycondensation can likewise be used, through the use of polyfunctional, polymeric and/or oligomeric components, as a mechanism for curing in adhesive or sealant formulations.

A disadvantage of the adhesive formulations of the prior art is the high, processing-relevant viscosity. It significantly complicates the processing of the adhesive composition, particularly its application to porous substrates. In some cases there are also instances of gelling in the condensation stage.

It is further disadvantageous that free-radically polymerized materials also contain a relatively high fraction of low molecular mass ingredients, which do not participate in the crosslinking reactions and which represent the extractable constituent of such reactive hot-melt adhesives.

A further disadvantage is that the extractables fraction in the cured adhesive is very high. One of the consequences of this is to reduce the resistance of the adhesive composition to solvents.

A different type of polymerization has come a considerable way closer to the aim of tailor-made polymers. The ATRP method (atom transfer radical polymerization) was developed in the 1990s significantly by Prof. Matyjaszewski (Matyjaszewski et al., J. Am. Chem. Soc., 1995, 117, p. 5614; WO 97/18247; Science, 1996, 272, p. 866), not least, specifically, with 2-(dimethylamino)ethyl (meth)acrylate (DMAEMA) (Zhang, Matyjaszewski, Macromolecules; 1999, 32, p. 1763-1766). This document describes pure, long DMAEMA blocks in block copolymers. Other descriptions of the copolymerization of monomers containing amine groups can be found in U.S. Pat. No. 6,541,580 B1 or in WO 03/031481 A3.

ATRP yields (homo)polymers with a narrow distribution in the molar mass range of $M_n$=10 000-120 000 g/mol. A particular advantage here is that not only the molecular weight but also the molecular weight distribution can be regulated. As a living polymerization, furthermore, it permits the controlled construction of polymer architectures such as, for example, random copolymers or else block copolymer structures. Appropriate initiators make it possible additionally, for example, to have access to unusual block copolymers and star polymers. Theoretical principles underlying the polymerization mechanism are elucidated in references including Hans Georg Elias, Makromoleküle, volume 1, 6th edition, Weinheim 1999, p. 344.

Block polymers have a sharp transition between the monomers in the polymer chain, which is defined as a boundary between the individual blocks. A typical synthesis process for AB block polymers is the controlled polymerization of monomer A and, at a later point in time, the addition of monomer B. Besides sequential polymerization by batchwise addition to the reaction vessel, a similar result can also be obtained by sharply altering the compositions of the two monomers, in the case of their continuous addition, at defined points in time.

As living or controlled polymerization methods, anionic polymerization or group-transfer polymerization is also accompanied by modern methods of controlled radical polymerization such as, for example, RAFT polymerization. The mechanism of RAFT polymerization is described in more detail in WO 98/01478 or EP 0910587. Application examples are found in EP 1205492.

The problems described above were solved in WO 05/047359 insofar as it was possible, employing a controlled polymerization method, in the form of atom transfer radical polymerization, to provide binders having very narrow molecular weight distributions, which as a result thereof exhibit only a low fraction of high molecular mass constituents as compared with (meth)acrylates polymerized free-radically. These constituents have the effect in polymer mixtures, in particular, of an increase in viscosity.

A disadvantage of the reactive adhesives prepared according to WO 05/047359, however, is a random distribution of the hydroxyl, mercapto and/or amine groups in the polymer chain of the binder. This leads to close-meshed crosslinking and hence to a reduced elasticity on the part of the adhesive composition. From this it is also possible for there to be a resulting deterioration in substrate bonding. This disadvantage comes to the fore in particular when polyisocyanates having more than two free isocyanate groups are used as a formulating ingredient of the reactive hot-melt adhesive. For a listing and description of the compounds bearing free isocyanate groups, reference may be made to the corresponding description in WO 05/047359.

A second example of potential applications of polymers of this kind which have a gradient or block structure is described below:

In order to effect homogeneous distribution and, where appropriate, stabilization of solids in a liquid or solid medium, such as, for example, in paints, aqueous pigment dispersions or moulding compounds, which for example are thermosetting and thermoplastic polymers, dispersants are added as auxiliaries. For this purpose they must have a variety of properties—such as, for example, that of interacting with the pigment surface. Dispersants ought, moreover, to possess regions in the molecule that are highly compatible with the medium. For organic media these are, for example, hydrophobic structures such as aryl structures or alkyl structures. For aqueous media, hydrophilic structures which are water-soluble ought to be used, such as polyethylene glycols.

Use is frequently made as dispersants of polymers based on ethylenically unsaturated monomers, such as (meth)acrylates or styrenes for example. The monomers are typically reacted by means of free radical polymerization. With the conventional processes it is possible only to obtain random distributions of the monomers within the chains. With polymer architectures of that kind, however, efficient dispersion is a poor possibility. Additionally, the problem of foam formation cannot be countered to any great extent. For the purpose of optimization in the cases of applications of the type described, therefore, new polymer architectures are needed.

For dispersions with low foam formation, for example, DE 10236133 and DE 1416019 prepare gradient copolymers with a very polar chain end segment consisting of hydroxy- or amine-functional repeat units by living polymerization and, respectively, controlled polymerization. Gradient copolymers are copolymers composed, for example, of the monomers A and B, in whose individual chains there is a gradient in the distribution of the monomer units along the chains. One chain end is rich in monomer A and poor in monomer B, the other end being rich in monomer B and poor in monomer A. Gradient copolymers border on block copolymers through the fluid transition between the monomers A and B.

Amine-functionalized block copolymers prepared by means of ATRP are described primarily in use as dispersants: In WO 00/40630, A-B diblock copolymers are described with an at least 50% degree of amine functionalization of the A blocks. This invention differs from the present invention in the merely uniterminal functionalization of the block copolymers, the longer blocks, the high degree of functionalization, and the attendant higher preparation costs overall for the polymers. In WO 03/046029 A1 the corresponding synthesis is particularized further and a description is given above all of dispersion with pigments. Here as well, however, only the diblock copolymers, which are more favourable than triblock copolymers for dispersing, are described. The same applies to EP 1501881 A1, which describes diblock copolymers amine-functionalized in one or both blocks, and their end-group functionalization by means of subsequent substitution.

A-B diblock copolymers with homopolymeric amine-functionalized blocks are described in Auschra et al. (Progress in Organic Coatings, 2002, 45, 83-93). Described analogously in WO 02/28913 A2 is the preparation of diblock copolymers with amine-functionalized homopolymer blocks. The amine groups are subsequently converted into quaternary ammonium groups in a polymer-analogous reaction. In WO 02/28913, however, this approach is only one alternative to the direct synthesis of the ionic polymers in aqueous systems, as is also described in US 2006/0008490 A1. In Gan et al. (J. Polym. Sci. —Part A: Polym. Chem., 2003, 41, 2688-2695), amine-functional blocks of this kind are combined analogously with tert-butyl methacrylate blocks, in order, through subsequent hydrolysis, to combine potentially anionic acid-functionalized blocks with potentially cationic ammonium blocks.

Chatterjee et al. (Polymer, 2005, 46, 10699-10708) describe ABA triblock copolymers with amine-functionalized outer blocks. In contradistinction to the present invention, however, the blocks in question are exclusively homopolymeric blocks, produced with the aim of realizing a particularly high polarity. That, however, is not the objective of the present invention. Here, instead, the aim is to introduce fewer functional reactive groups. The cited invention also differs from the present invention in that, in the case of the polymers described in the present specification, a large difference in solubility between the blocks is not wanted and in fact is harmful.

Another application of amine-functionalized blocks is in cosmetic applications such as hair rinses, for example. EP 1189976 B1 and EP 1189975 A1 describe ABA triblock copolymers with amine-functionalized A blocks and a polysiloxane B block introduced beforehand as a macroinitiator. Here as well the objective is the subsequent conversion of the amine groups into cationic ammonium groups. Further differences in relation to the present invention are the three- to four-stage synthesis of the polymers overall and the solubility of the polysiloxane segments, which is poor as compared with pure poly(meth)acrylates. The same application forms the basis for JP 2004277300 A2. There, however, amine groups are cited only as an alternative to potassium methacrylate blocks, by means of which an application-relevant adhesion to protein surfaces is brought about.

Further applications include use as a compatibilizer in polymer mixtures, as a prepolymer for building high molecular mass block structures, as binders for adhesives or as binders for sealants.

A new stage in the development are the triblock copolymers described below. A distinction is made between ABC and ABA triblock copolymers.

ABA triblock copolymers are to be equated in turn with 5-block copolymers of composition ACBCA.

It was an object to prepare triblock polymers of structure ABA. In particular there is a need for amine-terminated (meth)acrylates and/or (meth)acrylates which in terms of their properties match or come very close to amine-terminated materials. This can be achieved, for example, through the incorporation of one to a few amine groups at the chain end. Chain ends are used as a term for the end segment of a polymer, accounting for not more than 1-20% by weight of the total weight of the polymer.

(Meth)acrylates which carry amine chain ends, or amine-terminated (meth)acrylates, have suitability as pre-polymers for crosslinkings, the construction of diverse block structures through use in polycondensation and/or polyaddition reactions, for further reaction of the chain ends, with the objective of attaching functionalities which were hitherto inaccessible, or for specific biological reactions.

A further object of the invention is to provide polymers contained reactive hydroxyl groups, as binders, in such a way that the number of such groups in the polymer, while retaining effective availability for the curing reaction, is minimized. A relatively high fraction of polar groups in the binder leads to possible gelling or at least to an additional increase in the melt viscosity of the reactive hot-melt adhesive. This object can be achieved by the controlled attachment of the functionalities at the chain end or in its vicinity.

A further object is to provide such a material having a very narrow molecular weight distribution of less than 1.8. This minimizes not only the fractions of relatively high molecular mass constituents, whose effects include contributing to an unwanted increase in melt viscosity, but also the fractions of particularly low molecular mass constituents, which can induce deterioration in the solvent resistance of the adhesive composition.

In view of the identified and discussed prior art, one of the underlying objects was that of providing a reactive adhesive which has a large initial strength without occurrence of premature gelling. Moreover, the intention was to achieve a reduction in the viscosity, and/or in the stability of viscosity of a melt of the reactive adhesive at a given processing temperature, for the purpose of enhancing the processing properties. The object related, furthermore, among others, to only a small fraction of extractable components in the cured adhesive composition, and to very good adhesion properties with respect to a large number of different materials.

It is an object of the present invention, therefore, among others, to provide a binder for reactive hot-melt adhesives that either is amine-terminated or else has a small number of free amine groups in the vicinity of the chain ends. When formulated in reactive adhesive compositions, such materials feature higher elasticity of the adhesive composition. This also results in an improvement in adhesion to the substrate. Inventive polymers of this kind may also find use in sealants.

The object has been achieved by the making available of block copolymers of composition ABA with ≦4 functional groups in the individual A blocks, characterized in that block A, a copolymer containing amine-functionalized (meth)acrylates and monomers selected from the group of (meth)acrylates or mixtures thereof and one
block B, containing (meth)acrylates or mixtures thereof which have no amine function,
are polymerized as ABA block copolymers.

The (meth)acrylate notation here denotes not only methacrylate, such as methyl methacrylate, ethyl methacrylate, etc., for example, but also acrylate, such as methyl acrylate, ethyl acrylate, etc., for example, and also mixtures of both.

It has been found that ABA block copolymers having ≦2 amine groups in the individual A blocks can also be prepared.

Both to the copolymers of block A and to the copolymers of block B it is possible to add 0-50% by weight of ATRP-polymerizable monomers which are not included in the group of (meth)acrylates.

One preferred embodiment is represented by block copolymers which, with an ABA composition, have ≦4 amine groups in the individual A blocks and where the block A, a copolymer containing amine-functionalized (meth)acrylates and monomers selected from the group of (meth)acrylates or mixtures thereof and, optionally, further, ATRP-polymerizable monomers which are not included in the group of (meth)acrylates, and one block B, containing (meth)acrylates or mixtures thereof which have no amine function and, optionally, further, ATRP-polymerizable monomers which are not included in the group of (meth)acrylates, are polymerized as ABA block copolymers, it also being possible for the ATRP-polymerizable monomers to be copolymerized only in block A or to be copolymerized only in block B.

Less than 20% of the total weight of the block copolymers of composition ABA, preferably less than 10%, are made up of A blocks.

ABA triblock copolymers can be equated in turn with 5-block copolymers of composition ACBCA. With these block copolymers being characterized in that the composition of the C blocks corresponds to the composition of the non-amine-functionalized fraction in the A blocks.

In one particular embodiment, the block copolymers are characterized in that the individual A blocks may in turn inherently have an AC diblock structure and so lead to ACBCA pentablock copolymers.

These block copolymers may be characterized in that the composition of the C blocks corresponds to the composition of the non-amine-functionalized fraction in the A blocks.

Block A is composed of a maximum of 4 amine-functionalized monomers, from the group of amine-functionalized (meth)acrylates. Block B contains no amine-functionalized (meth)acrylates.

Moreover, a process has been developed for preparing block copolymers of composition ABA. Using a specific form of living polymerization, that of atom transfer radical polymerization (ATPR), it is possible to incorporate well-controlled compositions, architectures and defined functionalities into a polymer.

It has been found that through the use of a bifunctional initiator it is possible to construct an ABA or ACBCA structure in a controlled fashion.

Amine-functionalized (meth)acrylates which are polymerized in block A are preferably dialkylaminoalkyl (meth)acrylates, alkylaminoalkyl (meth)acrylates or aminoalkyl (meth)acrylates, of the general form $H_2C=CR^1—C(=O)XR^2NR^3R^4$. In this form, $R^1$ is hydrogen or a methyl group. $R^2$ stands for straight-chain, branched or cycloaliphatic, doubly functionalized hydrocarbon segments having 2 to 36 C atoms, which are introduced through esterification of amino alcohols with acrylic acid or methacrylic acid. X is oxygen or —NH—. $R^3$ and $R^4$ may be identical or else different organic radicals from the group of straight-chain, branched or cycloaliphatic alkyl and/or aryl radicals having 2 to 20 C atoms. Preferred more particularly are 2-dimethylaminoethyl methacrylate (DMAEMA), 2-diethylaminoethyl methacrylate (DEAEMA), 2-tert-butylaminoethyl methacrylate (t-BAEMA), 2-dimethylaminoethyl acrylate (DMAEA), 2-diethylaminoethyl acrylate (DEAEA), 2-tert-butylaminoethyl acrylate (t-BAEA), 3-dimethylaminopropylmethacrylamide (DMAPMA) and 3-dimethylaminopropylacrylamide (DMAPA).

Monomers which are polymerized both in block A and in block B are selected from the group of (meth)acrylates such as, for example, alkyl (meth)acrylates of straight-chain, branched or cycloaliphatic alcohols having 1-40 carbon atoms, such as, for example, methyl (meth)acrylate, ethyl (meth)acrylate, n-butyl (meth)-acrylate, isobutyl (meth)acrylate, tert-butyl (meth)acrylate, pentyl (meth)acrylate, 2-ethylhexyl (meth)acrylate, stearyl (meth)acrylate, lauryl (meth)acrylate, cyclohexyl (meth)acrylate, isobornyl (meth)acrylate; aryl (meth)acrylates such as, for example, benzyl (meth)acrylate or phenyl (meth)acrylate which may in each case have unsubstituted or mono- to tetra-substituted aryl radicals; other aromatically substituted (meth)acrylates such as, for example, naphthyl (meth)acrylate; mono(meth)acrylates of ethers, polyethylene glycols, polypropylene glycols or mixtures thereof having 5-80 carbon atoms, such as, for example, tetrahydrofurfuryl methacrylate, methoxy(m) ethoxyethyl methacrylate, 1-butoxypropyl methacrylate, cyclohexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether (meth)acrylate and poly(propylene glycol) methyl ether (meth)acrylate.

Besides the (meth)acrylates set out above it is possible for the compositions to be polymerized also to contain further unsaturated monomers which are copolymerizable with the aforementioned (meth)acrylates and by means of ATRP. These include, among others, 1-alkenes, such as 1-hexene, 1-heptene, branched alkenes such as, for example, vinylcyclohexane, 3,3-dimethyl-1-propene, 3-methyl-1-diisobutylene, 4-methyl-1-pentene, acrylonitrile, vinyl esters such as vinyl acetate, styrene, substituted styrenes with an alkyl substituent on the vinyl group, such as α-methylstyrene and α-ethylstyrene, substituted styrenes with one or more alkyl substituents on the ring such as vinyltoluene and p-methylstyrene, halogenated styrenes such as for example, monochlorostyrenes, dichlorostyrenes, tribromostyrenes and tetrabromostyrenes; heterocyclic compounds such as 2-vinylpyridine, 3-vinylpyridine, 2-methyl-5-vinylpyridine, 3-ethyl-4-vinylpyridine, 2,3-dimethyl-5-vinylpyridine, vinyl-pyrimidine, 9-vinylcarbazole, 3-vinylcarbazole, 4-vinylcarbazole, 2-methyl-1-vinylimidazole, vinyloxolan, vinylfuran, vinylthiophene, vinylthiolane, vinyl-thiazoles, vinyloxazoles and isoprenyl ethers; maleic acid derivatives, such as, for example, maleic anhydride, maleimide, methylmaleimide and dienes such as divinylbenzene, for example, and also, in the A blocks, the respective hydroxy-functionalized and/or amino-functionalized and/or mercapto-functionalized compounds. Furthermore, these copolymers may also be prepared such that they have a hydroxyl and/or amino and/or mercapto functionality in one substituent. Examples of such monomers include vinylpiperidine, 1-vinyl imidazole, N-vinylpyrrolidone, 2-vinylpyrrolidone, N-vinylpyrrolidine, 3-vinylpyrrolidine, N-vinylcaprolactam, N-vinylbutyrolactam, hydrogenated vinylthiazoles and hydrogenated vinyloxazoles. Particular preference is given to copolymerizing vinyl esters, vinyl ethers, fumarates, maleates, styrenes or acrylonitriles with the A blocks and/or B blocks.

The process can be carried out in any desired halogen-free solvents. Preference is given to toluene, xylene, $H_2O$; acetates, preferably butyl acetate, ethyl acetate, propyl acetate; ketones, preferably ethyl methyl ketone, acetone; ethers; aliphatics, preferably pentane, hexane, but also biodiesel.

The block copolymers of composition ABA are prepared by means of sequential polymerization.

Besides solution polymerization the ATPR can also be carried out as emulsion, miniemulsion, microemulsion, suspension or bulk polymerization.

The polymerization can be carried out under atmospheric, subatmospheric or superatmospheric pressure. The temperature of polymerization is also not critical. In general, however, it is situated in the range from −20° C. to 200° C., preferably from 0° C. to 130° C. and with particular preference from 50° C. to 120° C.

The polymer of the invention preferably has a number-average molecular weight of between 5000 g/mol and 10 000 g/mol, with particular preference $\leqq$50 000 g/mol and with very particular preference between 7500 g/mol and 25 000 g/mol.

It has been found that the molecular weight distribution is below 1.8, preferably below 1.6, with particular preference below 1.4 and ideally below 1.3.

As bifunctional initiators there can be $RO_2C$—$CHX$—$(CH_2)_n$—$CHX$—$CO_2R$, $RO_2C$—$C(CH_3)X$—$(CH_2)_n$—$C(CH_3)X$—$CO_2R$, $RO_2C$—$CX_2$—$(CH_2)_n$—$CX_2$—$CO_2R$, $RC(O)$—$CHX$—$(CH_2)_n$—$CHX$—$C(O)R$, $RC(O)$—$C(CH_3)X$—$(CH_2)_n$—$C(CH_3)X$—$C(O)R$, $RC(O)$—$CX_2$—$(CH_2)_n$—$CX_2$—$C(O)R$, $XCH_2$—$CO_2$—$(CH_2)_n$—$OC(O)CH_2X$, $CH_3CHX$—$CO_2$—$(CH_2)_n$—$OC(O)CHXCH_3$, $(CH_3)_2CX$—$CO_2$—$(CH_2)_n$—$OC(O)CX(CH_3)_2$, $X_2CH$—$CO_2$—$(CH_2)_n$—$OC(O)CHX_2$, $CH_3CX_2$—$CO_2$—$(CH_2)_n$—$OC(O)CX_2CH_3$, $XCH_2C(O)C(O)CH_2X$, $CH_3CHXC(O)C(O)CHXCH_3$, $XC(CH_3)_2C(O)C(O)CX(CH_3)_2$, $X_2CHC(O)C(O)CHX_2$, $CH_3CX_2C(O)C(O)CX_2CH_3$, $XCH_2$—$C(O)$—$CH_2X$, $CH_3$—$CHX$—$C(O)$—$CHX$—$CH_3$, $CX(CH_3)_2$—$C(-C(CH_3)_2$, $X_2CH$—$C(O)$—$CHX_2$, $C_6H_5$—$CHX$—$(CH_2)_n$—$CHX$—$C_6H_5$, $C_6H_5$—$CX_2$—$(CH_2)_n$—$CX_2$—$C_6H_5$, $C_6H_5$—$CX_2$—$(CH_2)_n$—$CX_2$—$C_6H_5$, o-, m- or p-$XCH_2$-Ph-$CH_2X$, o-, m- or p-$CH_3CHX$-Ph-$CHXCH_3$, o-, m- or p-$(CH_3)_2CX$-Ph-$CX(CH_3)_2$, o-, m- or p-$CH_3CX_2$-Ph-$CX_2CH_3$, o-, m- or p-$X_2CH$-Ph-$CHX_2$, o-, m- or p-$XCH_2$—$CO_2$-Ph-$OC(O)CH_2X$, o-, m- or p-$CH_3CHX$—$CO_2$-Ph-$OC(O)CHXCH_3$, o-, m- or p-$(CH_3)_2CX$—$CO_2$-Ph-$OC(O)CX(CH_3)_2$, $CH_3CX_2$—$CO_2$-Ph-$OC(O)CX_2CH_3$, o-, m- or p-$X_2CH$—$CO_2$-Ph-$OC(O)CHX_2$ or o-, m- or p-$XSO_2$-Ph-$SO_2X$ (X stands for chlorine, bromine or iodine; Ph stands for phenylene ($C_6H_4$); R represents an aliphatic radical of 1 to 20 carbon atoms, which may be linear, branched or else cyclic in structure, may be saturated or mono- or polyunsaturated and may contain one or more aromatics or else is aromatic-free, and n is a number between 0 and 20). Preference is given to using 1,4-butanediol di(2-bromo-2-methylpropionate), 1,2-ethylene glycol di(2-bromo-2-methylpropionate), diethyl 2,5-dibromoadipate or diethyl 2,3-dibromomaleate. The ratio of initiator to monomer gives the later molecular weight, provided that all of the monomer is reacted.

Catalysts for ATPR are set out in Chem. Rev. 2001, 101, 2921. The description is predominantly of copper complexes—among others, however, compounds of iron, of rhodium, of platinum, of ruthenium or of nickel are employed. In general it is possible to use any transition metal compounds which with the initiator, or with the polymer chain which has a transferable atomic group, are able to form a redox cycle. Copper can be supplied to the system for this purpose, for example, starting from $Cu_2O$, $CuBr$, $CuCl$, $CuI$, $CuN_3$, $CuSCN$, $CuCN$, $CuNO_2$, $CuNO_3$, $CuBF_4$, $Cu(CH_3COO)$ or $Cu(CF_3COO)$.

One alternative to the ATRP described is represented by a variant of it: in so-called reverse ATRP, compounds in higher oxidation states can be used, such as $CuBr_2$, $CuCl_2$, $CuO$, $CrCl_3$, $Fe_2O_3$ or $FeBr_3$, for example. In these cases the reaction can be initiated by means of conventional free-radical initiators such as, for example, AIBN. In this case the transition metal compounds are first reduced, since they are reacted with the radicals generated from the conventional free-radical initiators. Reverse ATRP has been described by, among others, Wang and Matyjaszewski in Macromolecules (1995), vol. 28, p. 7572 ff.

One variant of reverse ATRP is represented by the additional use of metals in the zero oxidation state. As a result of an assumed comproportionation with the transition metal compounds in the higher oxidation state, an acceleration is brought about in the reaction rate. This process is described in more detail in WO 98/40415.

The molar ratio of transition metal to bifunctional initiator is generally situated in the range from 0.02:1 to 20:1, preferably in the range from 0.02:1 to 6:1 and with particular preference in the range from 0.2:1 to 4:1, without any intention hereby to impose any restriction.

In order to increase the solubility of the metals in organic solvents and at the same time to prevent the formation of stable and hence polymerization-inert organometallic compounds, ligands are added to the system. Additionally the ligands facilitate the abstraction of the transferable atomic group by the transition metal compound. A listing of known ligands is found for example in WO 97/18247, WO 97/47661 or WO 98/40415. As a coordinative constituent, the compounds used as ligand usually contain one or more nitrogen, oxygen, phosphorus and/or sulphur atoms. Particular preference is given in this context to nitrogen compounds. Very particular preference is enjoyed by nitrogen-containing chelate ligands. Examples that may be given include 2,2'-bipyridine, N,N,N',N'',N''-pentamethyldiethylenetriamine (PMDETA), tris(2-aminoethyl)amine (TREN), N,N,N',N'-tetramethylethylenediamine or 1,1,4,7,10,10-hexamethyltriethylenetetramine. Valuable indicators relating to the selection and combination of the individual components are found by the skilled person in WO 98/40415.

These ligands may form coordination compounds in situ with the metal compounds or they may first be prepared as coordination compounds and then introduced into the reaction mixture.

The ratio of ligand (L) to transition metal is dependent on the denticity of the ligand and on the coordination number of the transition metal (M). In general the molar ratio is situated in the range 100:1 to 0.1:1, preferably 6.1 to 0.1:1 and with particular preference 3:1 to 1:1, without any intention hereby to impose any restriction.

A further advantage of the block copolymers is the colourlessness and the odourlessness of the product produced. The odourlessness is a function in particular of the sulphur-free preparation process.

Hence there is a broad field of application for these products. The selection of the application examples is not apt to restrict the use of the polymers of the invention. The examples are intended solely to serve to illustrate, in the manner of a random pick, the broad usefulness of the polymers described. Block copolymers of composition ABA are preferably used as prepolymers in adhesive compositions, sealants or reactive hotmelts. The prepolymers can be crosslinked with any desired polymers. Applications as binder, reactive component or dispersant in coating formulations are also conceivable.

The examples given below are given for the purpose of improved illustration of the present invention, but are not apt to restrict the invention to the features disclosed herein.

EXAMPLES

Example 1

A jacketed vessel equipped with stirrer, thermometer, reflux condenser, nitrogen introduction tube and dropping funnel was charged under an $N_2$ atmosphere with monomer 1a (precise identification and quantity in Table 1), 115 g of butyl acetate, 1.15 g of copper(I) oxide and 2.9 g of N,N,N',N'',N''-pentamethyldiethylenetriamine (PMDETA). The solution is stirred at 60° C. for 15 minutes. Subsequently, at the same temperature, 1,4-butanediol di(2-bromo-2-methylpropionate) (BDBIB) initiator in solution in butyl acetate is added dropwise (amounts—see Table 1). After a polymerization time of 3 hours a sample is taken for determination of the average molar weight $M_n$ (by means of SEC) and a mixture of monomer 2a and monomer 3a (precise identification and quantity in Table 1) is added. The mixture is polymerized to an anticipated conversion of at least 98% and is terminated by exposure to atmospheric oxygen and the optional addition of methylene chloride. The solution is worked up by filtration over silica gel and the subsequent removal of volatile constituents by means of distillation. The average molecular weight is determined, finally, by SEC measurements. The fraction of incorporated monomer 3a is quantified by means of $^1H$ NMR measurements.

Example 2

In the same way as in Example 1, monomers 1b, 2b and 3b (precise identification and quantity in Table 1) are used.

Example 3

In the same way as in Example 1, monomers 1c, 2c and 3c (precise identification and quantity in Table 1) are used.

Example 4

In the same way as in Example 1, monomers 1d, 2d and 3d (precise identification and quantity in Table 1) are used.

TABLE 1

|  | Example | | | |
| --- | --- | --- | --- | --- |
|  | 1 | 2 | 3 | 4 |
| Monomer 1 | 1a) n-BA | 1b) n-BA | 1c) MMA | 1d) MMA |
| Amount | 70 g | 70 g | 70 g | 70 g |
| Monomer 2 | 2a) MMA | 2b) n-BA | 2c) n-BA | 2d) MMA |
| Amount | 10 g | 10 g | 10 g | 10 g |
| Monomer 3 | 3a) DMAEMA | 3b) DMAEMA | 3c) DMAEMA | 3d) DMAEMA |
| Amount | 5.5 g | 5.5 g | 5.5 g | 5.5 g |
| Initiator amount | 3.2 g | 3.2 g | 3.2 g | 3.2 g |
| $M_n$ (1st stage) | 12 200 | 12 100 | 11 100 | 11 900 |
| $M_n$ (end product) | 17 000 | 16 200 | 15 800 | 15 600 |
| D | 1.19 | 1.31 | 1.24 | 1.23 |

MMA = methyl methacrylate;
n-BA = n-butyl acrylate,
DMAEMA = 2-dimethylaminoethyl methacrylate

Example 5

A jacketed vessel equipped with stirrer, thermometer, reflux condenser, nitrogen introduction tube and dropping funnel was charged under an $N_2$ atmosphere with monomer Ia (precise identification and quantity in Table 2), 120 g of butyl acetate, 1.15 g of copper(I) oxide and 2.9 g of PMDETA. The solution is stirred at 60° C. for 15 minutes. Subsequently, at the same temperature, 1,4-butanediol di(2-bromo-2-methyl-propionate) (BDBIB) initiator in solution in butyl acetate is added dropwise. After a polymerization time of 3 hours a sample is taken for determination of the average molar weight $M_n$ (by means of SEC) and monomer IIa (precise identification and quantity in Table 2) is added. After a calculated 98% conversion, finally, a mixture of monomer IIa' and monomer IIIa (precise identification and quantity in Table 2) is added. The mixture is polymerized to an anticipated conversion of at least 98% and is terminated by exposure to atmospheric oxygen and the optional addition of methylene chloride. The solution is worked up by filtration over silica gel and the subsequent removal of volatile constituents by means of distillation. The average molecular weight is determined, finally, by SEC measurements. The fraction of incorporated monomer IIIa is quantified by means of $^1H$ NMR measurements.

TABLE 2

|  | Example 5 |
|---|---|
| Monomer I | Ia) n-BA |
| Amount | 40 g |
| Monomer II | IIa) MMA |
| Amount | 40 g |
| Monomer II' | IIa') MMA |
| Amount | 10 g |
| Monomer III | IIIa) DMAEMA |
| Amount | 5.5 g |
| Initiator amount | 3.3 g |
| $M_n$ (1st stage) | 11 500 |
| $M_n$ (end product) | 18 400 |
| D | 1.29 |

MMA = methyl methacrylate;
n-BA = n-butyl acrylate,
DMAEMA = 2-dimethylaminoethyl methacrylate

Example 6

Comparative Example 1

Synthesis of Non-functionalized ABA Triblock Copolymers
General instructions for synthesizing the described ABA triblock copolymers by means of ATRP:

A jacketed vessel equipped with stirrer, thermometer, reflux condenser, nitrogen introduction tube and dropping funnel was charged under an $N_2$ atmosphere with monomer C1a (precise identification and quantity in Table 3), butyl acetate, copper(I) oxide and PMDETA. The solution is stirred at 60° C. for 15 minutes. Subsequently, at the same temperature, 1,4-butanediol di(2-bromo-2-methylpropionate) (BD-BIB) initiator in solution in butyl acetate is added dropwise. After the polymerization time $t_1$ of 3 hours a sample is taken for determination of the average molar weight $M_n$ (by means of SEC) and monomer C2a (precise identification and quantity in Table 3) is added. The mixture is polymerized to an anticipated conversion of at least 98% and is terminated by exposure to atmospheric oxygen and the optional addition of methylene chloride. The solution is worked up by filtration over silica gel and the subsequent removal of volatile constituents by means of distillation. The average molecular weight is determined, finally, by SEC measurements.

Example 7

Comparative Example 2

In the same way as in Example 6, monomers C1b and C2b (precise identification and quantity in Table 3) are used.

Example 8

Comparative Example 3

In the same way as in Example 6, monomers C1c and C2c (precise identification and quantity in Table 3) are used.

Example 9

Comparative Example 4

In the same way as in Example 6, monomers C1d and C2d (precise identification and quantity in Table 3) are used.

TABLE 3

|  | Example | | | |
|---|---|---|---|---|
|  | 6 | 7 | 8 | 9 |
| Monomer C1 | C1a) MMA | C1b) n-BA | C1c) n-BA | C1d) MMA |
| Amount | 84.88 g | 88.15 g | 84.47 g | 74.45 g |
| Monomer C2 | C2a) MMA | C2b) MMA | C2c) n-BA | C2d) n-BA |
| Amount | 15.12 g | 11.85 g | 15.13 g | 25.55 g |
| Initiator amount | 3.09 g | 2.51 g | 2.41 g | 2.72 g |
| $M_n$ (1st stage) | 7600 | — | 12 900 | 9200 |
| $M_n$ (end product) | 8100 | 14 500 | 13 800 | 8400 |
| D | 1.25 | 1.29 | 1.26 | 1.23 |

MMA = methyl methacrylate;
n-BA = n-butyl acrylate

The invention claimed is:

1. A block copolymer of composition ABA with ≦4 amine groups in the individual A blocks, wherein
    (i) block A, a copolymer comprising
        an amine-functionalized compound which is at least one monomer Selected from the group consisting of 2-dimethylaminoethyl methacrylate, 2-diethylaminoethyl methacrylate, 2-tert-butylaminoethyl methacrylate, 2-dimethylaminoethyl acrylate, 2-diethylaminoethyl acrylate, 2-tert-butylaminoethyl acrylate, 3-dimethylaminopropylmethacrylamide and 3-dimethylaminopropylacrylamide; and
        a monomers selected from the group of (meth)acrylates or mixtures thereof, and
    (ii) one block B, comprising a (meth)acrylates or mixtures thereof which have no additional functionality,
    are present in polymerized form as said ABA block copolymer.

2. The block copolymer according to claim 1, wherein the block copolymer comprises an ATRP-polymerizable monomers which are not included in the group of (meth)acrylates in block A and/or block B.

3. The block copolymer according to claim 1, wherein the block copolymer comprises an ATRP-polymerizable monomers which are not included in the group of (meth)acrylates in amounts of 0-50% by weight in blocks A and/or B.

4. The block copolymer according to claim 1, wherein the individual A blocks of the ABA block copolymers have ≦2 amine groups.

5. The block copolymers according to claim 1, wherein the individual A blocks comprise less than 20% of the total weight of the ABA block copolymer.

6. The block copolymer according to claim 5, wherein the individual A blocks comprise less than 10% of the total weight of the ABA block copolymer.

7. The block copolymer according to claim 1, wherein the individual A blocks have DC diblock structure resulting in a DCBCD pentablock copolymers
wherein the composition of the C blocks corresponds to the composition of the non-amine-functionalized fraction in the A blocks; and
wherein the composition of the D blocks corresponds to the composition of the amine-functionalized fraction in the A blocks.

8. The block copolymer according to claim 1, wherein the (meth)acrylate used in block A as a monomer is selected from the group consisting of alkyl(meth)acrylates of straight-chain, branched or cycloaliphatic alcohols having 1-40 carbon atoms, aryl(meth)acrylates, mono(meth)acrylates of ethers, mono(meth)acrylates of polyethylene glycols, mono(meth)acrylates of polypropylene glycols or mixtures thereof, each of said mono(meth)acrylates having 5-80 carbon atoms.

9. The block copolymer according to claim 1, wherein the blocks A and/or B comprise at least one member selected from the group consisting vinyl esters, vinyl ethers, fumarates, maleates, styrenes, acrylonitriles and other ATRP-polymerizable monomers.

10. A process for preparing a block copolymer of composition ABA as claimed in claim 1, wherein block A, and one block B are prepared by atom transfer radical polymerization (ATRP) in the presence of an initiator and of a catalyst in a halogen-free solvent.

11. The process according to claim 10, wherein the initiator is a bifunctional initiator.

12. The process according to claim 11, wherein 1,4-butanediol di(2-bromo-2-methylpropionate), 1,2-ethylene glycol di(2-bromo-2-methylpropionate), diethyl 2,5-dibromoadipate or diethyl 2,3-dibromomaleate is used as bifunctional initiator.

13. The process according to claim 10, wherein the block copolymer of composition ABA is prepared by sequential polymerization.

14. The process according to claim 10, wherein a transition metal compound is used as catalyst.

15. The process according to claim 14, wherein a compound of copper, of iron, of rhodium, of platinum, of ruthenium or of nickel is used as catalyst.

16. The process for preparing block copolymers according to claim 15, wherein a copper compound is used as catalyst.

17. The process according to claim 10, wherein prior to the polymerization the catalyst is brought together with a nitrogen compound, an oxygen compound, a sulphur compound or a phosphorus compound, wherein each compound is capable of forming one or more coordinative bonds with a transition metal of said catalyst to form a metal-ligand complex.

18. The process according to claim 17, wherein an N-containing chelate ligands are used as ligand.

19. The process according to claim 18, wherein 2,2'-bipyridine, N,N,N',N'',N''-pentamethyldiethylenetriamine (PMDETA), tris(2-aminoethyl)amine (TREN), N,N,N',N'-tetramethylethylenediamine or 1,1,4,7,10,10-hexamethyltriethylenetetramine is used as ligand.

20. The process according to claim 10, wherein the block copolymer has a number-average molecular weight of between 5000 g/mol and 100000 g/mol.

21. The process according to claim 20, wherein the block copolymer has a number-average molecular weight of between 7500 g/mol and 25000 g/mol.

22. The process according to claim 10, wherein the block copolymer has a molecular weight distribution of less than 1.8.

23. The process according to claim 22, wherein the block copolymer has a molecular weight distribution of less than 1.4.

24. An adhesive composition, a sealant, or a reactive hot-melt adhesive, comprising the block copolymer as claimed in claim 1.

25. A coating formulation, comprising:
the block copolymer as claimed in claim 1 as a binder, reactive component or dispersant.

* * * * *